(12) United States Patent
Jong

(10) Patent No.: US 11,157,770 B2
(45) Date of Patent: Oct. 26, 2021

(54) AUTOMATIC LINE ERASE TOOL AND METHOD

(71) Applicant: Cheng Ning Jong, North Chili, NY (US)

(72) Inventor: Cheng Ning Jong, North Chili, NY (US)

(*) Notice: Subject to any disclaimer, the term of this patent is extended or adjusted under 35 U.S.C. 154(b) by 77 days.

(21) Appl. No.: 16/792,606

(22) Filed: Feb. 17, 2020

(65) Prior Publication Data

US 2020/0265266 A1    Aug. 20, 2020

Related U.S. Application Data

(60) Provisional application No. 62/807,900, filed on Feb. 20, 2019.

(51) Int. Cl.
| | | |
|---|---|---|
| *G06K 9/62* | (2006.01) | |
| *G06K 9/00* | (2006.01) | |
| *G06T 11/00* | (2006.01) | |
| *G06T 11/60* | (2006.01) | |

(52) U.S. Cl.
CPC ....... *G06K 9/6256* (2013.01); *G06K 9/00463* (2013.01); *G06T 11/001* (2013.01); *G06T 11/60* (2013.01); *G06T 2210/12* (2013.01)

(58) Field of Classification Search
CPC ................................................. G06T 2210/12
See application file for complete search history.

(56) References Cited

U.S. PATENT DOCUMENTS

| | | | | |
|---|---|---|---|---|
| 4,663,616 A | * | 5/1987 | Christensen | G06T 11/00 345/681 |
| 4,951,227 A | * | 8/1990 | Todd | G06T 11/203 345/441 |
| 5,845,288 A | * | 12/1998 | Syeda-Mahmood | G06F 16/5846 |
| 6,496,195 B1 | * | 12/2002 | Gill | G06T 19/00 345/522 |
| 2003/0165264 A1 | * | 9/2003 | Tanabe | G06T 7/0004 382/141 |
| 2005/0288909 A1 | * | 12/2005 | Mikulecky | G06F 30/00 703/1 |
| 2006/0173657 A1 | * | 8/2006 | Haws | G06F 30/13 703/1 |
| 2007/0115278 A1 | * | 5/2007 | Tokumaru | G06F 30/00 345/419 |

(Continued)

*Primary Examiner* — David T Welch
(74) *Attorney, Agent, or Firm* — Tracy Jong Law Firm; Tracy P. Jong; Cheng Ning Jong

(57) ABSTRACT

A method for removing extraneous information from a drawing of a device having one or more parts, the extraneous information including a lead line and a part number, the method including detecting a starting point of a lead line with respect to a bounding box of the part number and determining a general direction of the starting point with respect to the bounding box, wherein the starting point is set as a current point; performing linear regression analysis of dark pixels in an area covered by a mask centrally located at the current point to yield a linear regression line slope; determining a next point based on the slope and the general direction; and updating the current point with the next point and repeating the performing and determining steps until the lead line ends; and removing the lead line based on a path traced by the starting and current points.

10 Claims, 9 Drawing Sheets

(56) References Cited

U.S. PATENT DOCUMENTS

| | | | |
|---|---|---|---|
| 2009/0148050 A1* | 6/2009 | Reghetti | G06F 30/00 382/219 |
| 2010/0138762 A1* | 6/2010 | Reghetti | G06T 19/20 715/765 |
| 2010/0250615 A1* | 9/2010 | Reghetti | G06F 30/00 707/802 |
| 2011/0043525 A1* | 2/2011 | Uchikura | G06T 11/00 345/427 |
| 2014/0201126 A1* | 7/2014 | Zadeh | A61B 5/165 706/52 |
| 2017/0220234 A1* | 8/2017 | Peres | G06F 3/0426 |
| 2018/0068182 A1* | 3/2018 | Jong | G06K 9/00456 |
| 2018/0204111 A1* | 7/2018 | Zadeh | G06K 9/3233 |
| 2018/0268259 A1* | 9/2018 | Dickie | G06K 9/4633 |
| 2019/0051029 A1* | 2/2019 | Schpok | G06K 9/00664 |
| 2020/0097617 A1* | 3/2020 | Zhilinsky | G06F 30/00 |
| 2020/0184278 A1* | 6/2020 | Zadeh | G06F 16/953 |
| 2020/0265612 A1* | 8/2020 | Tsai | G06F 16/5846 |

* cited by examiner

X Comp of Centroid of Cluster =
(X3 + X4 + X5) / (N or 3)

Y Comp of Centroid of Cluster =
(Y3 + Y2 + Y3) / (N or 3)

■ - Centroid

Move center of mask to centroid and find new centroid, repeat and save path

AUTOMATIC LINE ERASE TOOL AND METHOD

PRIORITY CLAIM AND RELATED APPLICATIONS

This non-provisional application claims the benefit of priority from provisional application U.S. Ser. No. 62/807,900 filed on Feb. 20, 2019. Said application is incorporated by reference in its entirety.

BACKGROUND OF THE INVENTION

1. The Field of the Invention

The present invention relates to an automatic line erase method. More specifically, the present invention is directed to an automatic line erase method for automatically removing lead lines used for indicating parts in patent drawings.

2. Background Art

The present patent authority in the U.S. and other patent authorities around the globe have largely been following the age-old method of publishing drawing figures in images of digital format, e.g., in ".pdf" format, without any sort of further semantic processing being applied to images. Derivations of information from patent drawings by a reader are often performed manually by the reader while manually correlating information from the description section of patents with their corresponding drawings. This process is slow, monotonous and distracts the reader from focusing on information sought. In some improvements to this process, a figure may be overlaid with notations to provide additional information regarding the figures, e.g., labels or descriptions of parts, etc., and sentences surrounding the parts. However, some figures may be quite crowded with lead lines leading to part numbers, making it difficult or distracting for readers to zoom in or focus on desired information. There have not been any pragmatic efforts made on the part of any patent authorities in requiring patent drawings to be submitted in a format suitable for semantic processing of the drawings, e.g., by requiring layering of information or representation of objects on screen or paper as digital objects capable to be manipulated. Even if semantic processing of patent drawings is adopted in the near future, there is still a large number of patent documents in existence today that have figures that do not carry additional data that can be readily relied upon. The number of published U.S. patents is currently over 10 million with even more U.S. patent publications. This problem is magnified with the large number of patent documents from other patent authorities. In keeping with any effort in increasing the availability of information, especially those associated with utility patent drawings such that information may be readily harvested from the drawings, extraneous information in the drawings may be removed to facilitate that process. Useful information that may be harvested from the drawings includes, but not limited to, the identity and number of the objects conveyed in the drawings and the objects conveyed by the drawings, etc. If the identity of an object can be detected from a drawing, the drawing can be verified to contain the object. This is useful in verifying that the drawing sufficiently depicts an object. If an object can be detected as a two-dimensional (2D) objects, an algorithm may be applied to convert this object drawn as line drawings in a two-dimensional plane to a solid model in a three-dimensional (3D) space. Drawings of a utility patent application are typically drawn with lead lines each terminated with or lead to a part number at one end of the lead line. Utility patent drawings therefore contain extraneous information that complicate processing of the drawings for the purposes disclosed herein.

There is a need to automatically process a patent figure to remove lead lines and replace them with information that can be selectively displayed over the patent figure in order to aid a reader in focusing on desired information while using the patent figure. There is a need to automatically extract features or objects from a patent figure to create and enhance semantic value of the patent figure from which features or objects are extracted. There is also a need to automatically process a patent figure to remove lead lines and part numbers such that machine-learned routine may be more readily taught and that an automatic 2D drawing to 3D solid model conversion can be more readily performed.

SUMMARY OF THE INVENTION

In accordance with the present invention, there is further provided a non-transitory computer readable medium storing a program causing a computer to execute a method for removing extraneous information from a drawing of a device having at least one or more parts, the extraneous information including a lead line and a part number, the method including:
 (a) detecting a starting point of the lead line with respect to a bounding box of the part number and determining a general direction of the starting point with respect to the bounding box, wherein upon detection, the starting point is set as a current point;
 (b) performing linear regression analysis of dark pixels in an area covered by a mask centrally located at the current point to yield a slope of a linear regression line of dark pixels in the mask;
 (c) determining a next point based on the slope and the general direction; and
 (d) updating the current point with the next point and repeating steps (b)-(c) until the current point is already the next point; and
 (e) removing the lead line based on a path traced by the starting point and current points.

In accordance with the present invention, there is further provided a method for removing extraneous information from a drawing of a device having at least one or more parts, the extraneous information including a lead line and a part number, the method including:
 (a) detecting a starting point of the lead line with respect to a bounding box of the part number and determining a general direction of the starting point with respect to the bounding box, wherein upon detection, the starting point is set as a current point;
 (b) performing linear regression analysis of dark pixels in an area covered by a mask centrally located at the current point to yield a slope of a linear regression line of dark pixels in the mask;
 (c) determining a next point based on the slope and the general direction; and
 (d) updating the current point with the next point and repeating steps (b)-(c) until the current point is already the next point; and
 (e) removing the lead line based on a path traced by the starting point and current points.

In one embodiment, the location of the bounding box is obtained by processing the drawing for at least one part number of the drawing and the position of the at least one part number to yield the part number. In one embodiment, the removing step includes turning the color of the lead line to white. In one embodiment, the method further includes removing the contents of the bounding box of the part number. In one embodiment, the second removing step includes turning the color of the contents of the bounding box of the part number to white.

An object of the present invention is to provide a tool and method for automatically removing extraneous information from a drawing figure such that the drawing figure can be used more effectively to train machine learning models or one or more elements depicted in a drawing figure can be recognized and extracted more readily.

Another object of the present invention is to provide a tool and method for automatically removing extraneous information from a drawing figure such that the presentation of the drawing figure may be improved.

Another object of the present invention is to provide a tool and method for automatically removing extraneous information from a drawing figure such that one or more solid models may be readily developed from one or more two-dimensional (2D) elements shown in the drawing figure.

Another object of the present invention is to provide a tool and method for automatically removing extraneous information from a drawing figure such that the improved drawing figure may be used as base data from which future tools may be developed.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
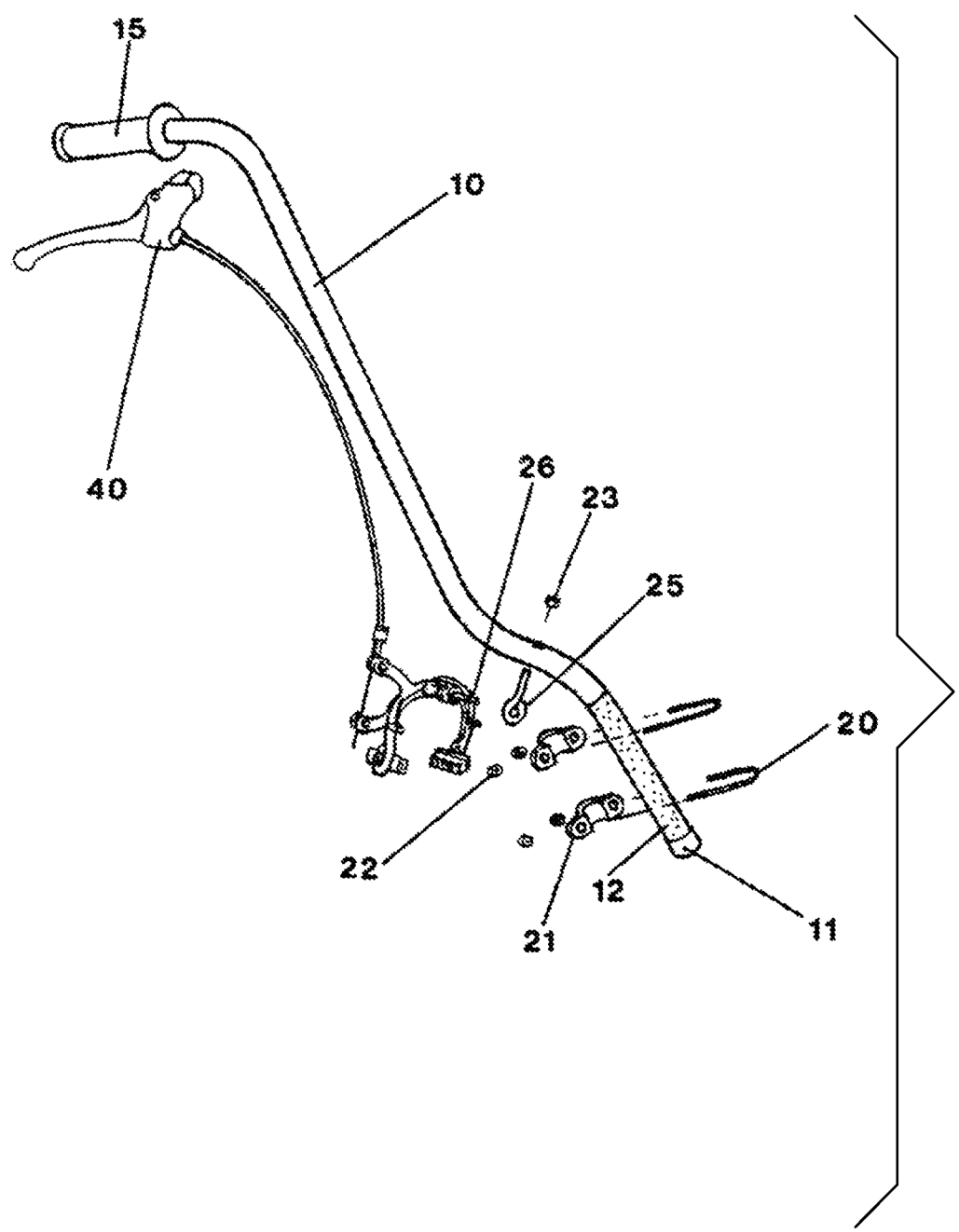
FIG. 1 is a diagram depicting a drawing figure of a utility patent.

2—lead line
4—an area showing cross-section of a lead line and a line of a part or element
6—part number
8—bounding box
10—corner of a bounding box
12—end point of lead line
14—starting point of lead line
16—line of a part or element
18—linear regression line
20—cropped area
22—cropped area
24—cropped area
26—detection envelope
28—upper boundary of lead line
30—lower boundary of lead line
32—area in which no dark pixels extend beyond the lead line
34—area in which dark pixels extend beyond the lead line, indicating that the lead line crosses a line of a part

PARTICULAR ADVANTAGES OF THE INVENTION

The present automatic line erase tool and method can be utilized to remove extraneous information from patent drawings such that a drawing object recognition routine may be trained with cleaner data or data without lead lines and part numbers.

The present automatic line erase method can be utilized to remove extraneous information from patent drawings such that a two-dimensional (2D) drawing to three-dimensional (3D) solid converter may be more readily applied to convert a 2D drawing to a 3D solid. An exemplary 2D drawing to a 3D solid converter can be found in http://www.mcsaz.com/software/snap2-3d.htm.

In accordance with the present automatic line erase method, an erasure of a lead line involves identifying a path that the lead line traces and then deleting the lead line according to the path. In one embodiment of the present method, automatic identification of areas on the drawing figures potentially occupied by specific elements may be used to automatically provide training instances. For example, it is possible to identify the meaning of a part number through the description associated with the part number in the body of a specification tied to the drawing figures. As each lead line physically ties a part number of a part to the location on a drawing figure that shows this part graphically, it is conceivable that an area pointed at by the lead line contains an image of this part. Therefore, the method can result not only in one or more cleaned drawing figures which can be provided in their entirety to train a machine learner but specific parts of the drawing figures may be automatically captured and provided to train a machine learner such that machine learning can be made more efficient or automated. Even if a machine learner is manually trained, an automatic detection of an area a user may be interested in makes harvesting of the elements more efficient, semi-automating the process of training an image classifier.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

As described elsewhere herein, a program stored in a non-transitory computer readable medium is used to cause a computer to execute to carry out various actions on a document including a drawing figure to produce an output suitable for aiding comprehension of the document by a user, suitable for use to train a machine learning image classifier and suitable for use as a base for generation of 3D solid models, etc. FIG. 1 is a diagram depicting a drawing figure of a utility patent. Various techniques have been developed in the realm of machine learning to train an image processing system to pick out one or more objects from photographs and drawings. One or more drawing figures are typically used in a utility patent application to aid in explaining an inventive concept. Although the drawing figures are accompanied with descriptions, there are no requirements for the drawing figures to be systematically broken down into their basic elements or semantically linked to elements making up the drawing figures. Drawing figures may be manually parsed such that tags reflecting the elements of the drawing figures can be generated and associated with the drawing figures. However, such practice is time consuming and cost prohibitive. Left alone, no additional information will be obtained from the drawing figures. Often times, environmental objects that are depicted in drawing figures are not properly explained. Therefore, if the drawing figures are based solely on the descriptions that accompany them, those environmental objects will not be discovered without human intervention. Further, tremendous amounts of information incorporated in drawing figures cannot be automatically unlocked if extraneous information, e.g., lead lines and part numbers are present, complicating processing of images in the drawing figures.

Figure 2:
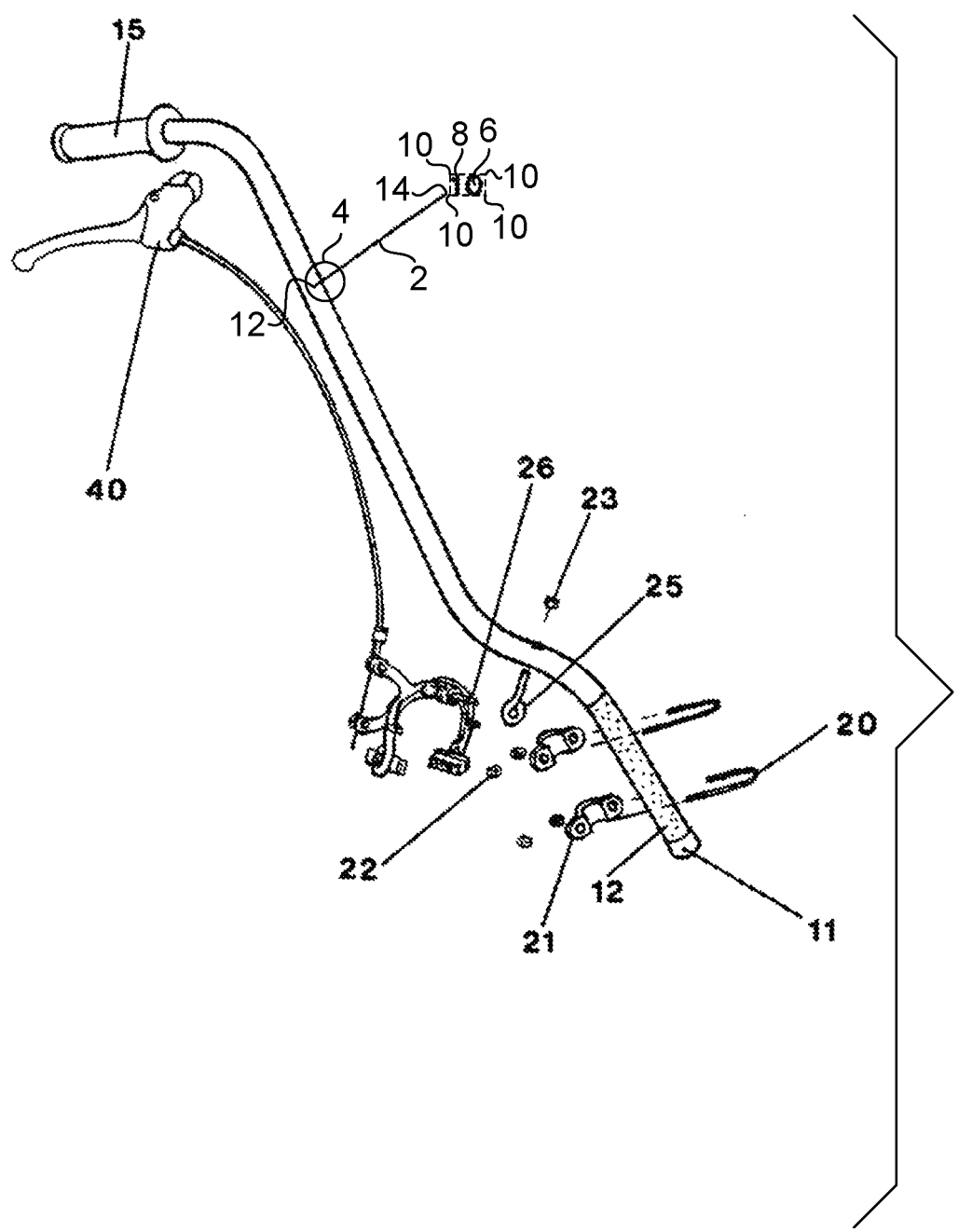
FIG. 2 is a diagram depicting a drawing figure of a utility patent with part numbers each associated with a lead line and a part of the drawing figure.

FIG. 2 is a diagram depicting a drawing figure of a utility patent with part numbers each associated with a lead line and a part of the drawing figure. Here, Applicant wishes to clarify the terminology used to describe the elements that are to be removed or erased or otherwise manipulated with a present method. As can be seen in FIG. 2, there is a drawing figure that is labeled "FIGURE 2." In this drawing figure, part numbers "10, 11, 12, 15, 20, 21, 22, 23, 25, 26 and 40" are used in conjunction with straight lead lines to point to elements that appear to show a bicycle handlebar and brake assembly. Note that the lead line 2 is coupled with a part number 6 that is labelled "10" where the lead line 2 extends from a starting point 14 to an end point 12. Area 4 shows the crossing of a lead line 2 and a line of an element showing a handlebar.

Figure 2A:
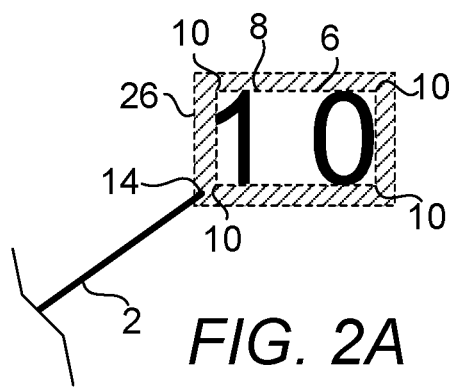
FIG. 2A is a close-up view of a part number of FIG. 2 depicting a step of a process by which the starting point of the lead line associated with this part number is determined.
Figure 3:
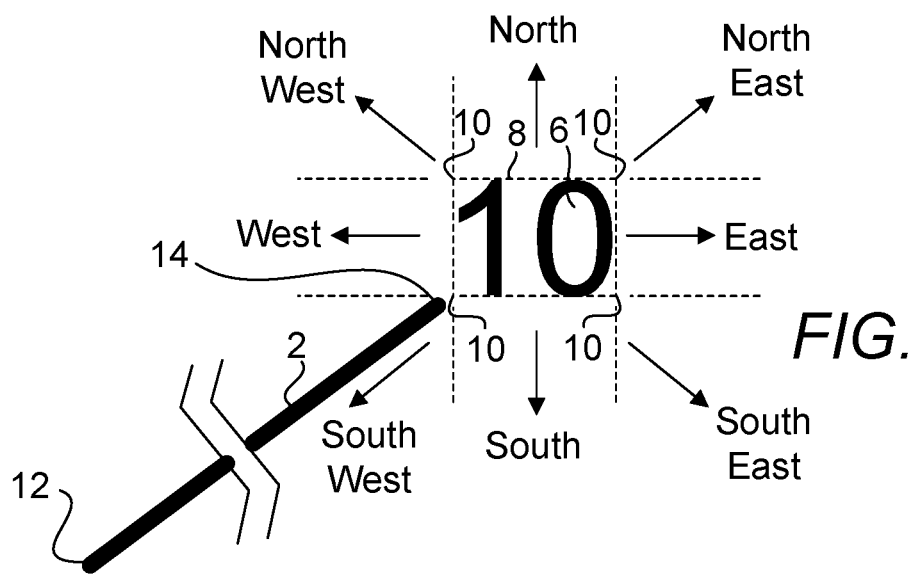
FIG. 3 is a close-up view of a part number and a portion of the lead line associated with the part number.

FIG. 2A is a close-up view of a part number of FIG. 2 depicting a step of a process by which the starting point 14 of the lead line 2 associated with this part number 6 is determined. FIG. 3 is a close-up view of a part number 6 and a portion of the lead line 2 associated with the part number 6. An image feature extraction algorithm, e.g., a commercially available software algorithm, e.g., Matlab® image processing module, open-source software, e.g., OpenCV and Tesseract can be readily used to extract almost all if not all part numbers from a drawing figure. Upon detection of a part number, the location of the part number is made available, e.g., the location of the lower left corner of the bounding box 8, the height and span of the bounding box 8. Therefore, the location of the part number 6 includes, but not limited to, any one or more of the location of corners 10 of the bounding box. A lead line 2 is typically drawn starting from a location near a part number 6 at a starting point 14 and continues to an end point 12 indicating an element in a drawing figure. As the end point 12 is typically used to point to a part, it is highly likely that an area surrounding the end point 12 includes at least a portion of the element pointed to. The starting point 14 typically falls just outside of the bounding box as shown in FIGS. 2A and 3. In the example shown in FIGS. 2A and 3, the starting point 14 falls just outside the bounding box 8, in an area "SouthWest" of the bounding box 8 as shown in FIG. 3. The starting point 14 shall be identified first as shown in FIG. 2A. Here, the area surrounding the bounding box 8 is first searched for a starting point of a lead line 2. In doing so, a predetermined area outside of the bounding box 8 up to the detection envelope 26, is searched for concentrations of dark pixels, e.g., a band of a particular thickness or offset, e.g., 20 pixels or another suitable value. Upon achieving a certain concentration level of dark pixels, a centroid of the highest concentration of dark pixels is determined. This centroid represents the starting point 14 of a lead line 2. It is possible for a starting point 14 to fall in other areas, e.g., "West," "NorthWest," "North," "Northeast," "East," "SouthEast" and "South" of the bounding box 8. Referring to FIG. 3, the location of the starting point 14 with respect to the bounding box 8 gives the starting general direction for which to trace the path of the lead line. For instance, if the starting point 14 falls just outside the bounding box 8, in area SouthWest of the bounding box 8, then the starting general direction to take will be in the SouthWest direction.

Figure 4:
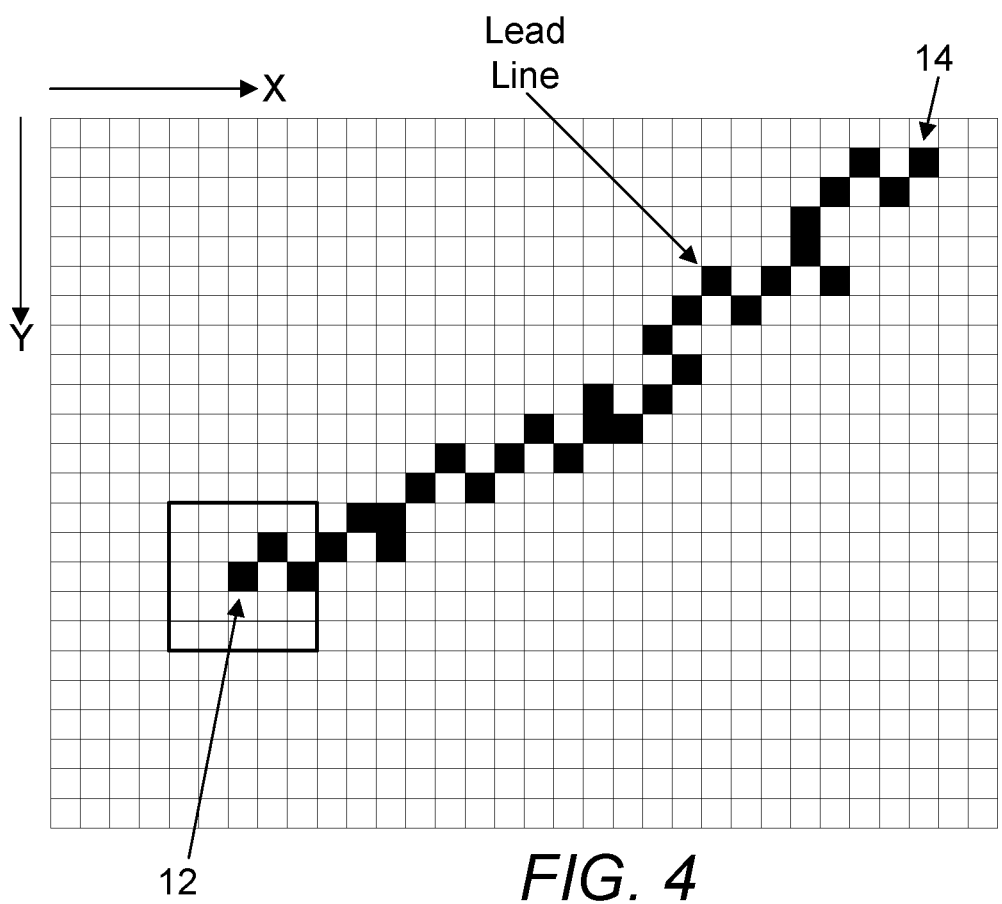
FIG. 4 is a diagram representing a close-up view of a lead line.

FIG. 4 is a diagram representing a close-up view of a lead line 2 from a starting point 14 to an end point 12. In this and other examples depicting close-up views of a portion or portions of a drawing figure, each square represents a pixel. A darkened or dark pixel represents a portion of a line if its grayscale threshold exceeds a certain value in a digital representation. For instance, in an 8-bit system, a value of 0×00 would represent a color black and a value of 0×FF would represent a white pixel. A value below or the same as a threshold of 0×7F or 127 may be treated as a part of a line.

Figure 5:
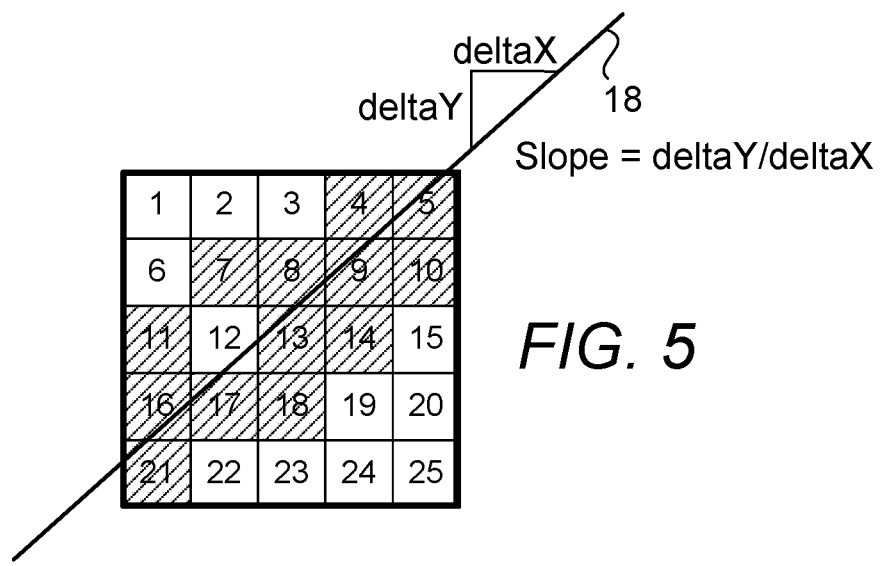
FIG. 5 is a diagram depicting a manner in which a first parameter of lead line tracing is determined.

FIG. 5 is a diagram depicting a manner in which a first parameter of lead line tracing is determined. Here, there is provided a strategy for following or tracing the line from the starting point 14 of the lead line to the end point 12 of the lead line. Lead lines come in various thicknesses with a 5-pixel by 5-pixel being an adequately sized mask sufficient to show the general direction of the line. For instance, there is preferably sufficient white spaces around the line to indicate the direction of the line. In this example, the mask is 5-pixel by 5-pixel. Larger mask sizes, e.g., 7-pixel by 7-pixel and 9-pixel by 9-pixel are possible although in some cases, they may take significantly longer to process and the dark pixels which are not parts of a lead may be inadvertently removed. Note that the mask covers an area of 25 pixels with the enumeration of the boxes in the mask indicating pixels. Pixel labeled 13 represents the center of this mask. Each hatched box represents a dark pixel that is a part of a line. Boxes 4, 5, 7, 8, 9, 10, 11, 13, 14, 16, 17, 18 and 21 all represent parts of a line. Upon detecting a starting point, a mask is placed such that the center of the mask coincides with the starting point. A centroid and a slope of the hatched boxes can be calculated. The slope or deltaY/deltaX can be obtained from performing a linear regression analysis on the hatched boxes while the centroid can be found using a calculation that is demonstrated in FIG. 6. As a lead line can be a straight or a curved line, the present method must be capable of tracing the lead line even when its direction changes from the starting point to the end point. For instance, line 18 represents the linear regression line for the hatched boxes shown in FIG. 5. In tracing a line, the mask is advanced from a current point to a centroid of the hatched boxes. It is also possible to always advance to an adjacent pixel (or one of the eight pixels surrounding the current pixel) instead of a centroid of hatched boxes. However, such micro stepping of the mask is found to only slow down the tracing without significantly increasing the quality or accuracy of the trace. Therefore, tracing a line from a centroid of a group of hatched boxes to the centroid of a next group of hatched boxes enables this process to progress more rapidly, cutting down the delay in completing this process from the starting point of a lead line to the end point of a lead line.

Figure 6:
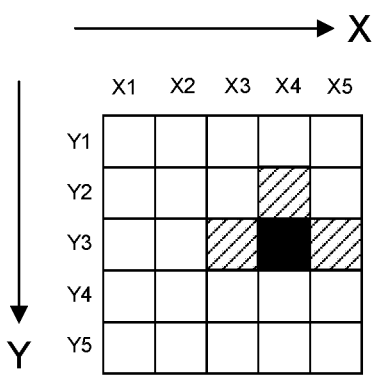
FIG. 6 is a diagram depicting a manner in which a second parameter of lead line tracing is determined.
Figure 8:
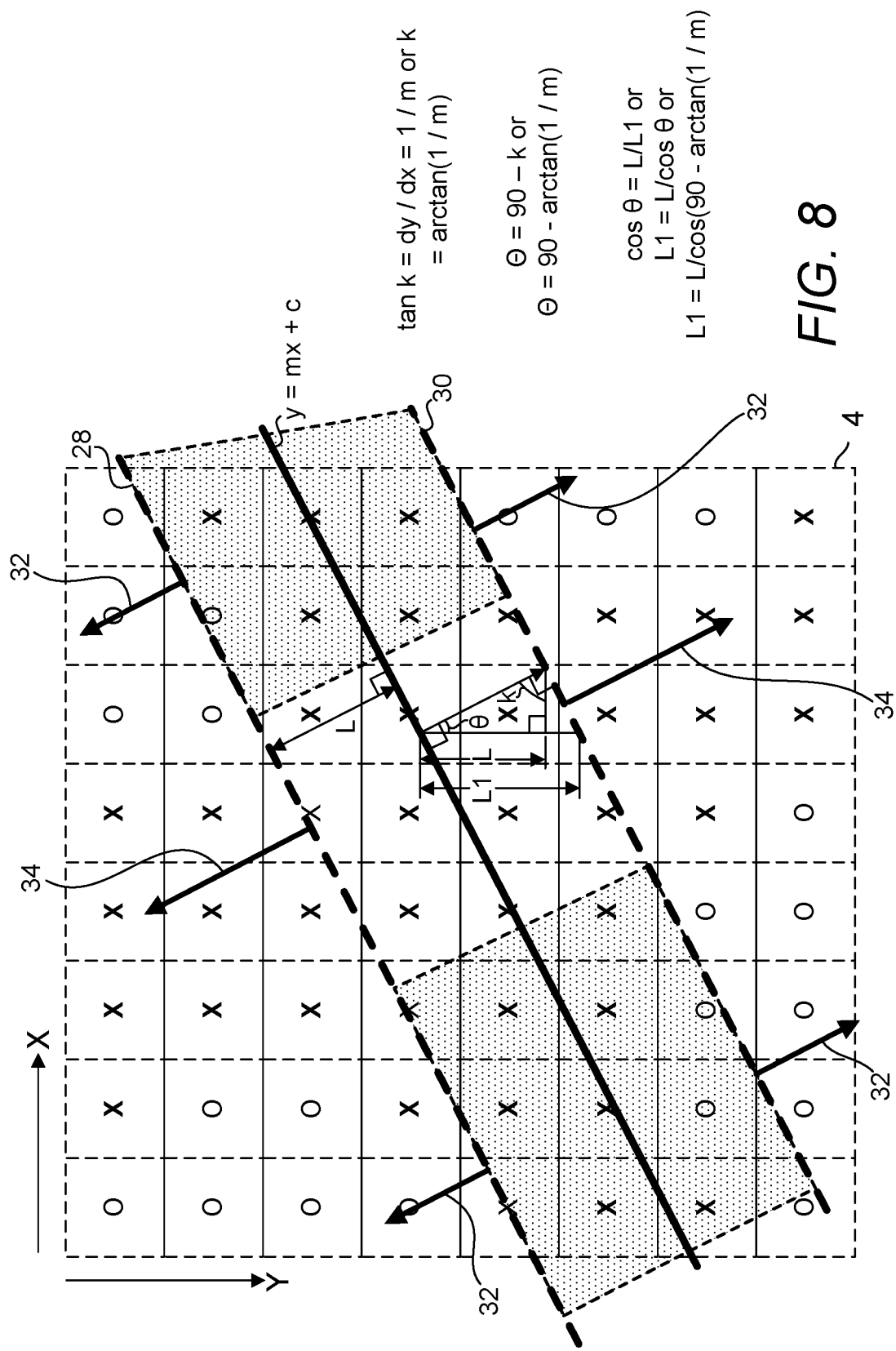
FIG. 8 is a close-up view of a portion of a lead line which crosses a line representing a part and a manner in which the lead line is traced to its end point.

FIG. 6 is a diagram depicting a manner in which a second parameter of lead line tracing is determined. In this example, only three hatched boxes are shown as it is useful for depicting a manner in which the centroid of the hatched boxes can be determined. The coordinates of the centroid can be calculated as (X Comp, Y Comp) where X Comp=(X3+X4+X5)/(N or 3) and Y Comp=(Y3+Y2+Y3)/(N or 3) and N is the number of hatched boxes. For a lead line which does not cross one or more lines constituting a portion of a part the lead line points at, the steps disclosed elsewhere herein would simply trace from the starting point to the end point. For a lead line drawn to cross one or more lines constituting a portion of a part the lead line points at, a method is shown in FIG. 8 to demonstrate the manner in which such a line can be traced to its end point.

Figure 7:
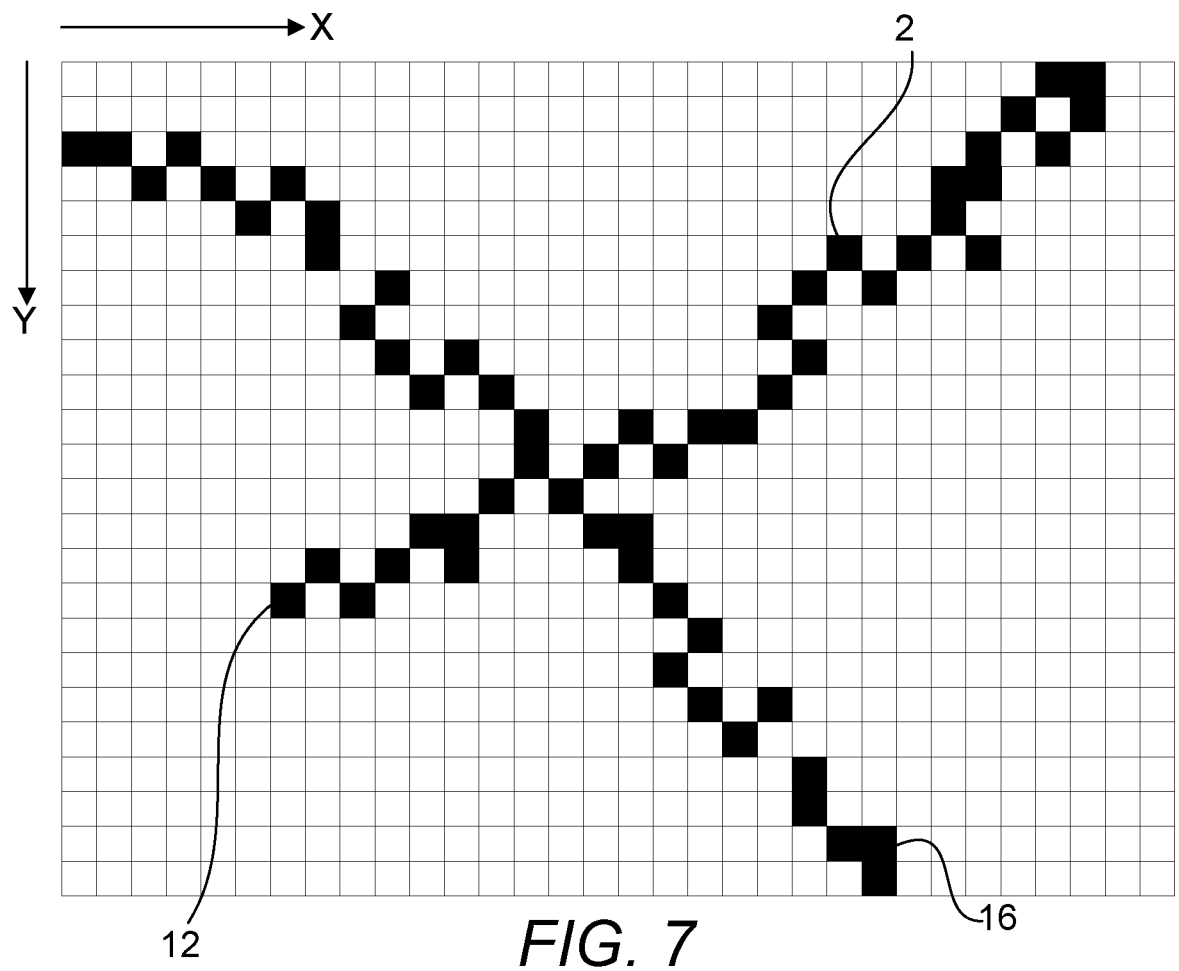
FIG. 7 is a diagram depicting a close-up view of a case where a lead line crosses a line representing a part.

FIG. 7 is a diagram depicting a close-up view of a case where a lead line 2 crosses a line 16 representing a part as shown in area 4 of FIG. 2. FIG. 8 is a close-up view of a portion of a lead line which crosses a line 16 representing a part and a manner in which the lead line is traced to its end point. Here, each pixel representing a part of a lead line is labeled "X" while each "O" represents a white background. The solid line labeled "y=mx+c" represents the linear regression line with a slope "m" and this line represents the part of the lead line over which a mask has been placed. Note that this line crosses a band of dark pixels labeled "X." This band represents the line which the lead line crosses. The equation y=mx+a=mx+c+L1 represents the upper boundary 28 of the lead line while the equation y=mx+b=mx+c−L1 represents the lower boundary 30 of the lead line where L1=L/cos(90−arctan(1/m)), c is the intercept of a "Y" axis with respect to the "X-Y" coordinate system as shown in FIG. 7 and L is half of the thickness of the lead line. As the thickness of a lead line can be established prior to the crossing of this lead line of a line representing a part, dark pixels of at least several pixels deep, e.g., 10 pixels, that fall outside of this lead line (as determined using the equations that represent the upper and lower boundaries of the lead line) are considered a part of the line the lead line crosses. These dark pixels that are considered a part of the line the lead line crosses and the lead line itself at this crossing area are not to be erased. In summary, if the pixels surrounding the pixels representing the lead line are deemed dark pixels as shown as areas 34, then the portion of the lead line surrounded by the dark pixels are not erased as they represent a part of the line the lead line crosses. If dark pixels are confined within the upper and lower boundaries, the dark pixels are deemed a part of the lead line, i.e., the areas on both sides of the lead line are areas 32. Upon completing tracing of a lead line, the pixels representing the lead line would have been identified. Therefore, the pixels can be subsequently turned into white pixels, essentially deleting or removing the lead line. The entire content of the bounding box of the corresponding part number may be turned into white pixels or the pixels representing the part number may be turned into white pixels to remove the part number.

Figure 9:
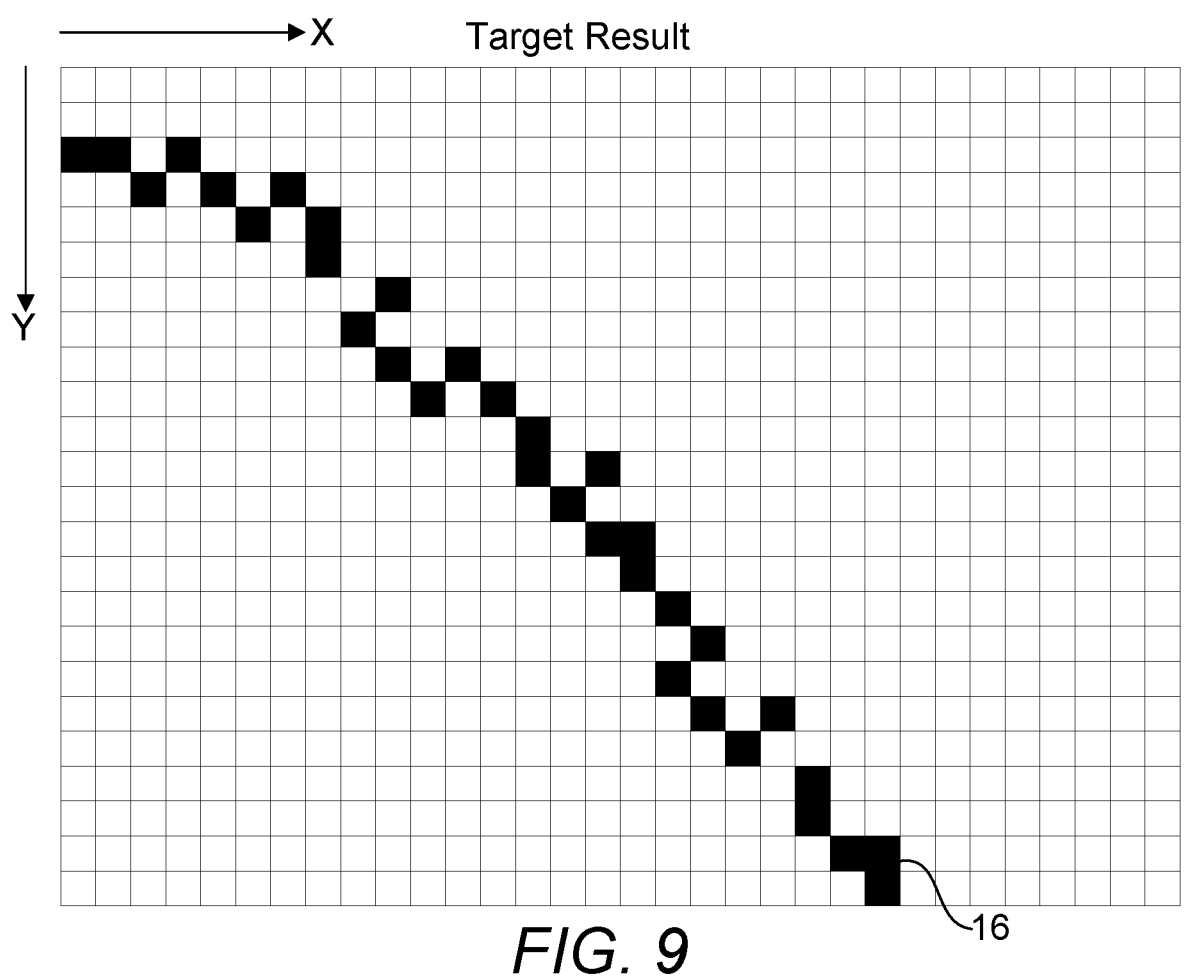
FIG. 9 is a close-up view of the view shown in FIG. 7 with the lead line erased.
Figure 10:
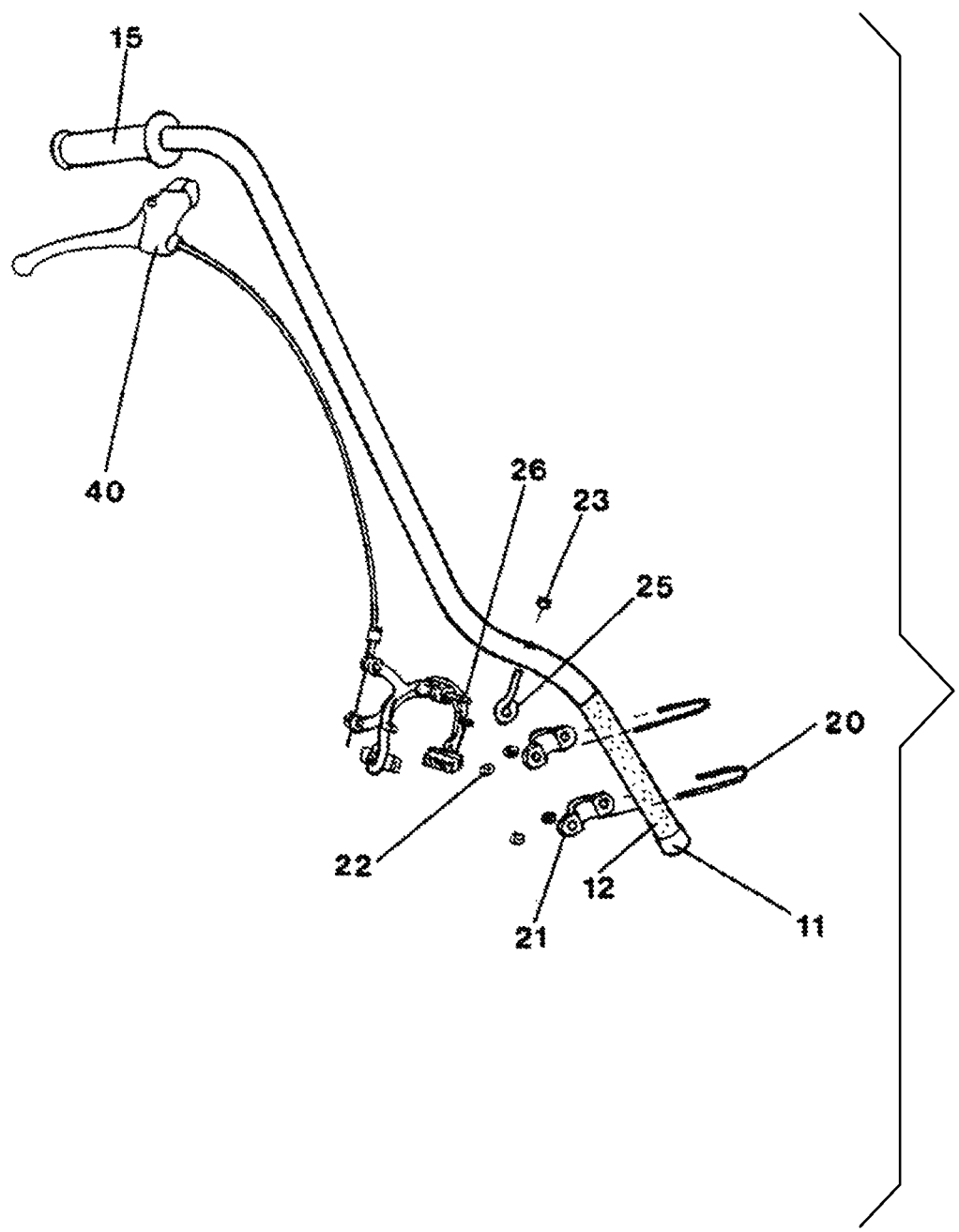
FIG. 10 is a diagram depicting a drawing figure shown in FIG. 1 with the exception that the lead line associated with part 10 and the same part number have been erased according to the present line erase tool and method.
Figure 11:
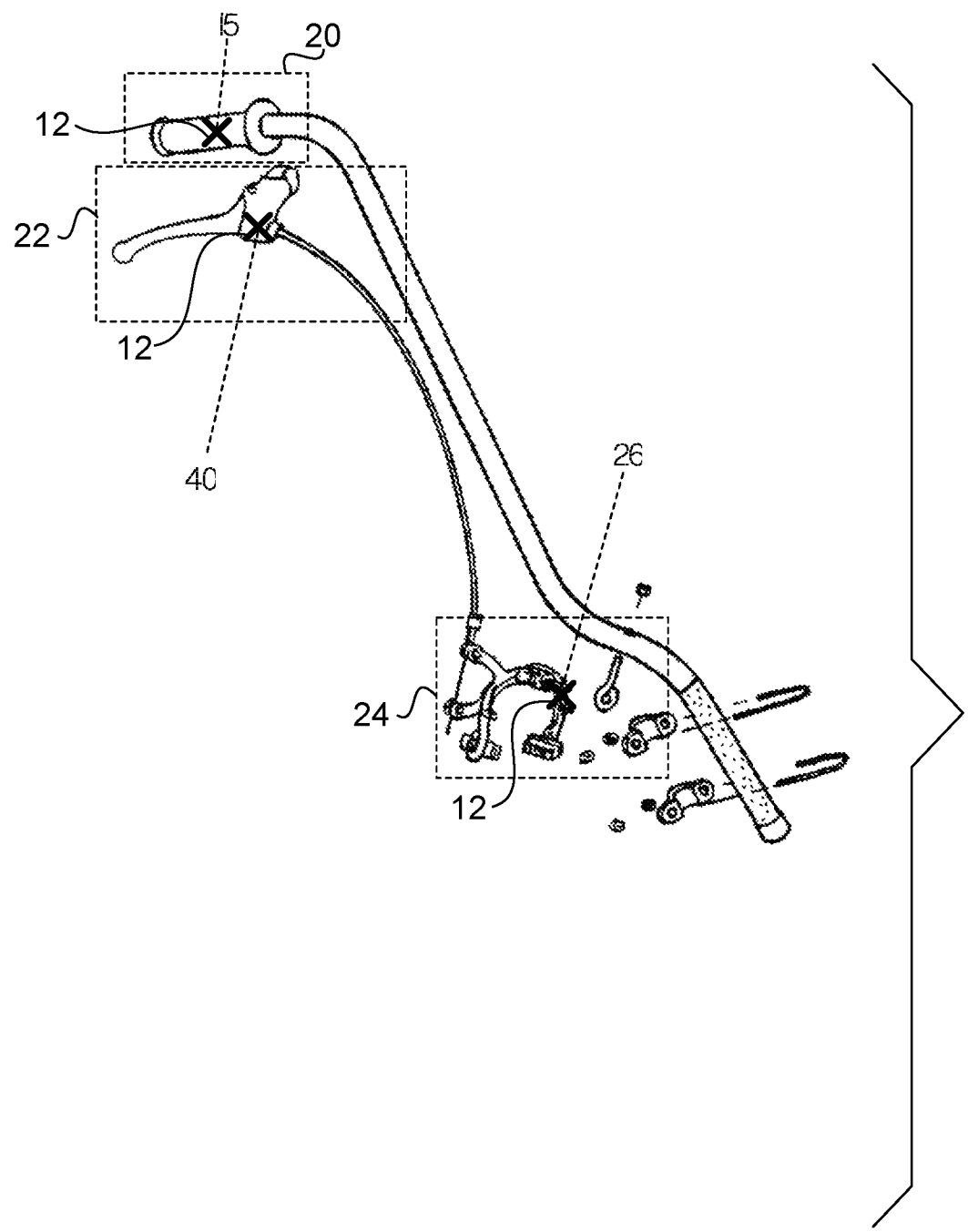
FIG. 11 is a diagram depicting a drawing figure shown in FIG. 1 with the exception that the lead lines of all parts have been erased according to the present line erase tool and method.

FIG. 9 is a close-up view of the view shown in FIG. 7 with the lead line 2 erased. FIG. 10 is a diagram depicting a drawing figure shown in FIG. 1 with the exception that the lead line associated with part 10 and the same part number have been erased according to the present line erase tool and method. FIG. 11 is a diagram depicting a drawing figure shown in FIG. 1 with the exception that the lead lines of all parts have been erased according to the present line erase tool and method.

Once the lead lines and part numbers of a line drawing have been removed automatically, one or more parts of the drawing may be manually cropped to result in clips of certain objects. For instance, cropped areas 20, 22 and 24 may be obtained as images corresponding to a handle, a brake lever and a brake caliper, respectively. These images may then be used to train a machine learning image classifier. By removing the lead lines and part numbers from line drawings, the drawings can be more readily used to train the image classifier as they contain a reduced amount of extraneous data. Alternatively, portions of the drawing may be cropped automatically. As the end point of a lead line can be obtained automatically and the part label can be associated with a part number, an area surrounding the end point 12 can be automatically cropped to result in an object showing a part corresponding to the part label. Parts may be associated with their part numbers according to strategies disclosed in U.S. non-provisional Pat. App. No. 15616129.

Further, results obtained from the present method are useful as base two-dimensional (2D) structures for automatic conversion of the 2D drawings to three-dimensional (3D) drawings. For instance, software application SNAP2-3D may be used for automatically converting 2D drawings to 3D solid models automatically, reducing the effort spent on manipulating the 2D drawings before they can be converted to 3D solid models. See http://www.mcsaz.com/software/snap2-3d.htm for examples where 2D drawings are used for constructing 3D models automatically.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for removing extraneous information from a drawing of a device having at least one or more parts, the extraneous information comprising a lead line and a part number, said method comprising:
    (a) detecting a starting point of the lead line with respect to a bounding box of the part number and determining a general direction of said starting point with respect to said bounding box, wherein upon detection, said starting point is set as a current point;
    (b) performing linear regression analysis of dark pixels in an area covered by a mask centrally located at said current point to yield a slope of a linear regression line of dark pixels in said mask;
    (c) determining a next point based on said slope and said general direction;
    (d) updating said current point with said next point and repeating steps (b)-(c) until said current point is already said next point; and
    (e) removing the lead line based on a path traced by said starting point and current points.

2. The method of claim 1, wherein the location of said bounding box is obtained by processing the drawing for at least one part number of the drawing and the position of said at least one part number to yield the part number.

3. The method of claim 1, wherein said removing step comprises turning the color of the lead line to white.

4. The method of claim 1, further comprising removing the contents of said bounding box of the part number.

5. The method of claim 4, wherein said second removing step comprises turning the color of the contents of said bounding box of the part number to white.

6. A non-transitory computer readable medium storing a program causing a computer to execute a method for removing extraneous information from a drawing of a device having at least one or more parts, the extraneous information comprising a lead line and a part number, said method comprising:
    (a) detecting a starting point of the lead line with respect to a bounding box of the part number and determining a general direction of said starting point with respect to said bounding box, wherein upon detection, said starting point is set as a current point;
    (b) performing linear regression analysis of dark pixels in an area covered by a mask centrally located at said current point to yield a slope of a linear regression line of dark pixels in said mask;
    (c) determining a next point based on said slope and said general direction;
    (d) updating said current point with said next point and repeating steps (b)-(c) until said current point is already said next point; and
    (e) removing the lead line based on a path traced by said starting point and current points.

7. The non-transitory computer readable medium of claim 6, wherein the location of said bounding box is obtained by processing the drawing for at least one part number of the drawing and the position of said at least one part number to yield the part number.

8. The non-transitory computer readable medium of claim 6, wherein said removing step comprises turning the color of the lead line to white.

9. The non-transitory computer readable medium of claim 6, further comprising removing the contents of said bounding box of the part number.

10. The non-transitory computer readable medium of claim 9, wherein said second removing step comprises turning the color of the contents of said bounding box of the part number to white.

* * * * *